(12) United States Patent
Murayama et al.

(10) Patent No.: US 6,278,113 B1
(45) Date of Patent: *Aug. 21, 2001

(54) SCANNING PROBE MICROSCOPE

(75) Inventors: Ken Murayama, Tsuchiura; Takashi Shirai, Tsukuba; Takafumi Morimoto, Kashiwa; Hiroshi Kuroda, Tsuchiura; Harumasa Onozato, Ohme; Tsuyoshi Nishigaki, Tsuchiura, all of (JP)

(73) Assignee: Hitachi Construction Machinery Co, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,790

(22) Filed: Oct. 6, 1998

(30) Foreign Application Priority Data

Jan. 27, 1998 (JP) .................................................. 10-029285

(51) Int. Cl.⁷ .................................................. H01J 37/20
(52) U.S. Cl. ...................................... 250/306; 250/442.11
(58) Field of Search .............................. 250/306, 442.11, 250/441.11, 440.11

(56) References Cited

U.S. PATENT DOCUMENTS

| | | | |
|---|---|---|---|
| 4,749,867 | * 6/1988 | Matsushita et al. | 250/442.11 |
| 4,766,465 | 8/1988 | Kazuo . | |
| 5,153,494 | 10/1992 | Hollis, Jr. . | |
| 5,672,816 | * 9/1997 | Park et al. | 250/306 |
| 6,093,930 | * 7/2000 | Boyette, Jr. et al. | 250/306 |

FOREIGN PATENT DOCUMENTS

| | | |
|---|---|---|
| 908 719 | 4/1999 | (EP) . |
| 6-281449 | 7/1994 | (JP) . |
| 93-25928 | 12/1993 | (WO) . |

\* cited by examiner

*Primary Examiner*—Kiet T. Nguyen
(74) *Attorney, Agent, or Firm*—Mattingly, Stanger & Malur

(57) ABSTRACT

A scanning probe microscope is provided with a probe tip directed to a sample surface, an XYZ fine movement mechanism for providing a relative positional change between the sample and the probe tip, and a displacement detecting section for detecting the displacement of the probe tip. The scanning probe microscope measures the surface characteristic of the sample by using a control signal. This control signal is generated on a signal outputted from the displacement detecting section and is used for keeping a state of a mutual action generated between the sample and the probe tip identical to a predetermined state, while the probe tip scans the surface of the sample based on the operation of the XYZ fine movement mechanism. Further, it comprises a moving section arranged on a standard surface of a microscope stage, which has the sample on an upper surface and moves along the standard surface based on a static pressure guide, a height-position control section for selectively supplying high-pressure fluid to the moving section so as to carry out the static pressure guide and controlling the height-position of the moving section to the standard surface, and an actuating mechanism for moving the moving section in directions parallel to the standard surface.

8 Claims, 7 Drawing Sheets

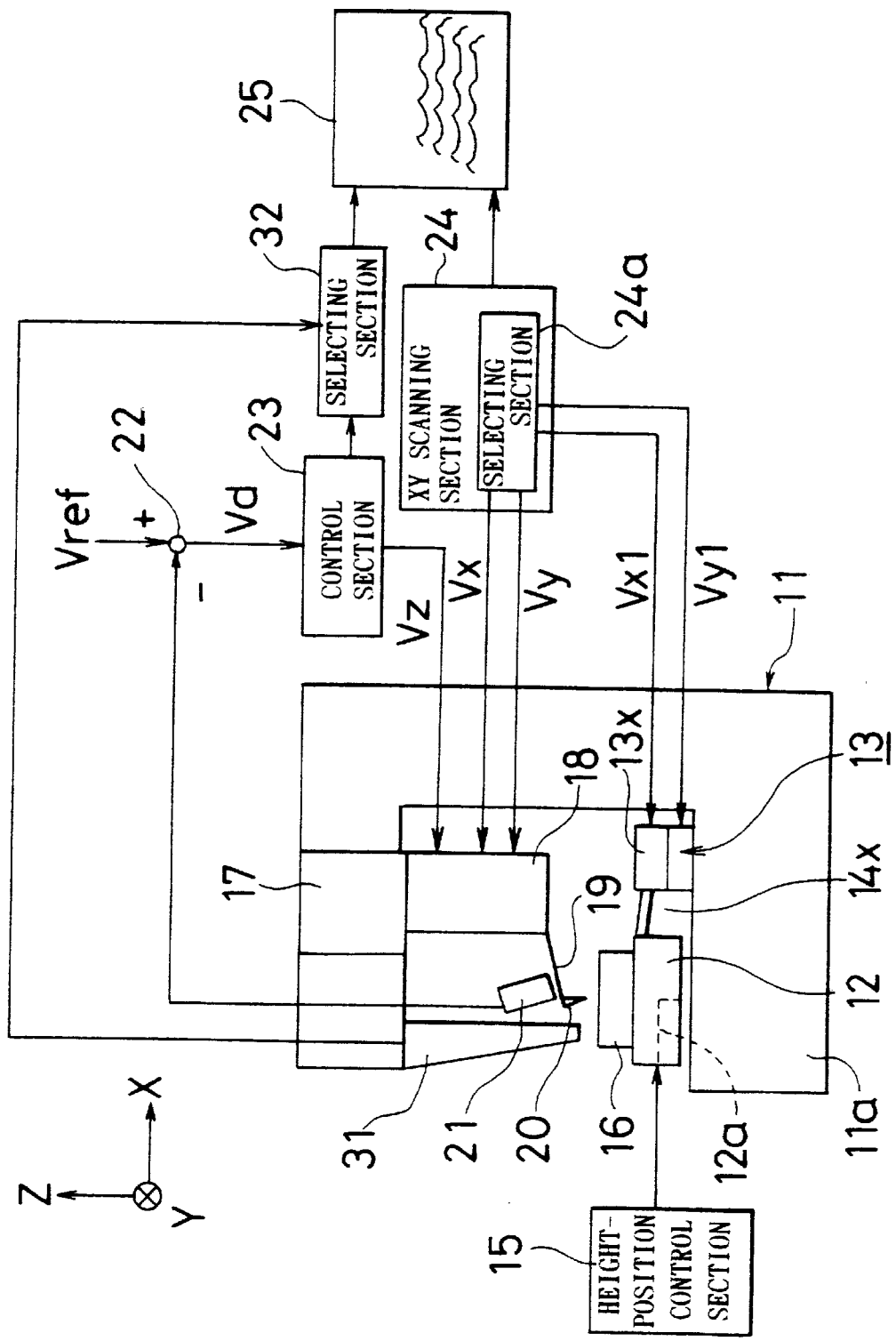

SCANNING PROBE MICROSCOPE

BACKGROUND OF THE INVENTION

1. Field of the Invention

The present invention relates to a scanning probe microscope, and more particularly to a scanning probe microscope capable of selectively carrying out high-resolution measurement based on scanning operation in a fine range and low-resolution measurement based on scanning operation in a wide range, and further being easily combined with other measuring probes.

2. Description of Related Art

A scanning probe microscope (SPM) has high measurement resolution equal to a size of atoms (no more than a nanometer (nm) scale). The scanning probe microscope has been generally used for measuring a surface shape of fine objects and is further being utilized in various fields. The scanning probe microscopes are classified into a scanning tunnel microscope (STM), an atomic force microscope (AFM), and a magnetic force microscope (MFM), etc. depending on a physical amount used for detecting operation, and therefore application domains are being increased. Especially, the AFM is suitable for detecting an even shape of sample surfaces in high resolution, and is achieving satisfactory results in the fields of semiconductor devices and disks. Hereinafter, an example of an AMF will be explained.

FIG. 6 shows one example of a conventional AMF. A sample stage 101a on which a sample 102 to be observed is placed is formed in a lower section of a frame 101. The sample 102 is kept to be static and its position is not changed. A probe tip approaching mechanism (coarse movement mechanism) 103 is fixed to the upper section of the frame 101 and further an XYZ fine movement mechanism 104 is fixed to the lower side of the probe tip approaching mechanism 103.

A cantilever 105 is disposed at an upper position above the sample 102. A probe tip 106 arranged at the tip of the cantilever 105 is directed to a surface of the sample 102. When measuring the surface of the sample 102, the probe tip 106 is placed close to the sample 102 so that the atomic force can be created between the probe tip and the sample. A basic end of the cantilever 105 is fixed to the lower end of the XYZ fine movement mechanism 104. The cantilever 105 has a necessary flexibility and therefore has such a characteristic that flexual deformation is produced depending on a change of the atomic force in relation to a change of the distance between the probe tip and the sample.

The configuration shown in FIG. 6 shows a system in which the side of the cantilever 105 is movable. The probe tip approaching mechanism 103 causes the probe tip 106 to approach the sample 102 quickly before carrying out the measurement and thus is used for the movement of a comparatively larger distance (coarse movement). The XYZ fine movement mechanism 104 is a tripod type fine movement mechanism or a tube type fine movement mechanism, which is configured by utilizing piezoelectric elements. The tripod type fine movement mechanism is provided with X, Y and Z actuators for producing a fine movement in X, Y and Z directions respectively. In case of using the tripod type fine movement mechanism as the XYZ fine movement mechanism 104, when carrying out the measurement, the X and Y actuators included in the XYZ fine movement mechanism 104 cause the cantilever 105 to scan the sample surface, while the Z actuator included in the mechanism 104 adjusts the distance between the probe tip 106 and the sample 102.

A displacement detector 107 is arranged for detecting displacement of the cantilever 105. As the displacement detector 107, an optical-lever-type detection optical system or a detector utilizing an interference method is used, for example. The optical-lever-type detection optical system comprises a laser source for emitting a laser beam and a photodetector for receiving the laser beam emitted from the laser source. The laser beam emitted from the laser source is reflected on a rear surface of the cantilever and afterward is incident on the photodetector. The incident position of the laser beam on the photodetector changes in response to the amount of the flexural deformation of the cantilever, the change as to the distance between the probe tip and the sample can be detected on the incident position of the laser beam in the photodetector.

When the operation of the probe tip approaching mechanism 103 causes the probe tip 106 to approach the sample at a fine distance of about 1 nm, the atomic force generated between the probe tip and the sample acts the cantilever 105 to produce the flexural deformation. The displacement detector 107 detects a flexural angle in the cantilever 105. A detecting signal outputted from the displacement detector 107 is inputted into an adder 108. The adder 108 compares the detecting signal with a standard value $V_{ref}$ and outputs a difference (deviation) signal Vd between the detecting signal and the standard value. The difference signal Vd is inputted into a control section 109. This control section 109 generally carries out proportional and integral compensation (PI control) and an output signal (Vz) from the control section 109 is supplied to the Z actuator of the XYZ fine movement mechanism 104 so as to change the distance between the probe tip 106 and the sample 102 to become a set value. The distance between the probe tip 106 and the sample 102 is always kept to be a predetermined constant distance based on the standard value $V_{ref}$.

The above-mentioned configuration controls the distance between the probe tip 106 and the sample 102 so that the distance is always kept to be constant. An XY scanning circuit 110 provides two output signals (Vx, Vy) to the X and Y actuators of the XYZ fine movement mechanism 104, respectively. The scanning signals (Vx, Vy) outputted from the XY scanning circuit 110 are used for causing the probe tip 106 to scan the surface of the sample 102 in the directions of the X-axis and the Y-axis. While the scanning operation is carried out, as mentioned above, the distance between the probe tip 106 and the sample 102 is maintained to be identical with the constant value set in advance.

Data Vz corresponding to the movement amount due to the Z actuator and data (Vx, Vy) as to output signals of the XY scanning circuit 110 are stored in a memory (not shown in the figure). As the result of carrying out necessary processing to these data, images as to the sample surface obtained by the measurement are displayed on a screen of a display unit 111. The shape of the surface in the sample 102 can be observed on the basis of the images. The atomic force microscope performing the measurement as mentioned above has very high measurement resolution, and in this microscope, further, when performing the measurement, a range for the measurement can be easily switched from a few nanometers scale to a few hundred micrometer scale.

In the aforementioned conventional AFM, the measurable range thereof is limited by that of the XYZ fine movement mechanism 104. It is essential for the XYZ fine movement mechanism 104 to use solid actuators formed by piezoelectric elements in order to make sure of the resolution of the atomic size level, as mentioned above. Consequently, the movable range of the conventional XYZ fine movement mechanism 104 sets a limit to about 100 μm. Even if a stroke in the XYZ fine movement mechanism 104 is expanded in order to expand the movable range, its resolution is lowered. Therefore, it was general for the conventional AFM to set its scanning range as a fine range of about 10 μm in view of a practical aspect.

On the other hand, in recent years, a request to measure a surface shape in a wide range, such as undulation on the surface of silicon wafers, by using a microscope with high measurement resolution no more than a nanometer level, like the AFM, is gradually increased. If the measurable range of the SPM having the high measurement resolution can be expanded in response to circumstances, value in use as the microscopes will be extremely raised.

Furthermore, there are many occasions that the use to combine the SPM utilizing the probe tip 106 with other different probes such as an ultrasonic microscope probe or a laser beam microscope probe, etc. is required. When making the complex configuration of the probe tip and a probe of another type, it is essential for the complex configuration to add a unit capable of expanding a scanning range, since the microscopes using the probe of another type have the low resolution in comparison with the AFM.

SUMMARY OF THE INVENTION

An object of the present invention is to provide a scanning probe microscope capable of measuring a wide range by changing operation mode to expand the scanning range in response to necessity with keeping high measurement resolution no more than a nanometer level, and further being easily combined with probes of another type such as the ultrasonic probe or the laser beam probe, etc.

The scanning probe microscope of the present invention is configured as follows in order to attain the above-mentioned object.

The scanning probe microscope comprises a probe tip disposed to be directed to a surface of a sample, an XYZ fine movement mechanism for providing a relative positional change between the sample and the probe tip, and a displacement detecting section for detecting displacement of the probe tip. When the probe tip scans a surface of the sample based on the operation of the XYZ fine movement mechanism, the scanning probe microscope measures the surface characteristic of the sample by using a control signal, which is generated on a signal outputted from the displacement detecting section for detecting the displacement of the probe tip and is used for keeping a state of a mutual action generated between the sample and the probe tip identical to a predetermined state. It further comprises a moving section arranged on a standard surface of a microscope stage, which has the sample on an upper surface thereof and moves along the standard surface based on a static pressure guide at a base thereof, a height-position control section for selectively supplying high-pressure fluid to the moving section so as to carry out the static pressure guide and controlling the height-position of the moving section to the standard surface, and an actuating mechanism for moving the moving section in the directions parallel to the standard surface. The moving section, the height-position control section and the actuating mechanism compose a movement mechanism.

In the above-mentioned scanning probe microscope, the XYZ fine movement mechanism comprises a height-direction fine movement mechanism (Z fine movement mechanism) for changing a height-position of the probe tip to the surface of the sample, and a surface-directions fine movement mechanism (XY fine movement mechanism) for changing a relative position between the sample and the probe tip in the directions parallel to the surface of the sample. When causing the probe tip to scan the surface of the sample, either one of the movement mechanism and the surface-directions fine movement mechanism is used and thereby the surface characteristic of the sample is measured.

In the scanning probe microscope, when carrying out scanning operation by the surface-directions fine movement mechanism, the static pressure guide of the movement mechanism is stopped to cause the moving section to be placed in contact with the standard surface. On the other hand, when carrying out scanning operation by the movement mechanism, the static pressure guide of the movement mechanism is operated and the surface-directions fine movement mechanism is stopped.

The scanning probe microscope comprises a switching section for selectively switching the operation of the surface-directions fine movement mechanism and the movement mechanism.

In the scanning probe microscope, measurement based on the scanning operation of the movement mechanism is coarse measurement in a wide range on the surface of the sample.

In the scanning probe microscope, the movement mechanism is used as a position determining mechanism.

The scanning probe microscope further comprises a measuring probe of another type, and the movement mechanism is used for carrying out scanning operation when measuring the sample by the measuring probe.

The measuring probe of another type is an ultrasonic probe or a laser beam probe.

In the above-mentioned scanning probe microscope, further, when causing the probe tip to scan the surface of the sample in order to measure the surface characteristic of the sample, it is possible that the surface-directions fine movement mechanism is operated, while the height-position control section of the movement mechanism is operative.

In the scanning probe microscope having measurement resolution no more than 1 nm, such as the atomic force microscope and the like, when the distance between the probe tip and the sample changes, the measurement resolution is deteriorated. For example, when the rigidity of the unit mechanism is easily affected by outside disturbances, such as vibration of a floor or sounds and the like, the measurement is harmfully influenced by them. Then, in order to avoid the harmful situation for the measurement, the rigidity of the unit mechanism is raised as high as possible so that both the probe tip and the sample can perform the same relative movement against the outside disturbances. The scanning probe microscope of the present invention, as maintaining the high measurement resolution, has the XY movement mechanism of the static pressure guide type, which comprises the moving section, the height-position control section and the actuating mechanism, besides the XYZ fine movement mechanism providing a relative displacement to the sample and the probe tip.

The XY movement mechanism emits a high-pressure fluid such as an air or a liquid and the like through a bottom section of the moving section, so that a high-pressure layer can be produced between the moving section and the standard surface and the moving section can be moved in a floating state against the standard surface.

When carrying out the wide-range measurement, the XY movement mechanism of the static pressure guide type is actuated, while the height-direction fine movement mechanism is maintained to be operative and the surface-directions fine movement mechanism is inoperative in the XYZ fine movement mechanism. Thus, the scanning probe microscope measures the sample in a wide range by using the XY movement mechanism. Since the moving section mounting the sample is held with a high pressure above the standard surface of the microscope stage in the XY movement mechanism of the static pressure guide type, the rigidity of the unit mechanism can not be decreased and therefore the wide-range measurement of a few mm to a few hundreds mm becomes possible together with the original high-resolution measurement of the nanometer size level. After carrying out the wide-range measurement, when the observation or the measurement with the higher resolution as to certain special places is wanted, the scanning probe microscope can be changed to become the mode of the high-resolution measurement.

When the static pressure guide in the XY movement mechanism is stopped after the XY movement mechanism moves the moving section to the place to be observed in order to set the position for the high-resolution measurement, the moving section is kept at rest by coming into contact with the standard surface of the microscope stage and thereby the rigidity of the unit mechanism is greatly raised. When carrying out the high-resolution measurement by using the XYZ fine movement mechanism of the conventional scanning probe microscope in the static state of the moving section, the surface shape of the sample can be measured with the high-resolution no more than 1 nm.

Further, in case of combining the scanning probe microscope having the above-mentioned characteristic configurations with a different kind microscope with low-measurement resolution such as the ultrasonic microscope or the laser beam microscope, the sample scanning operation due to the ultrasonic probe or laser beam probe is conducted by the aforementioned XY movement mechanism of the static pressure guide type, while the scanning operation as to the scanning probe microscope with the high resolution is conducted by using the conventional XYZ fine movement mechanism. Thus, the combination of the two different-type microscopes can be made easily.

BRIEF DESCRIPTION OF THE DRAWINGS

FIG. 4 is a view showing a configuration of the second embodiment of the present invention.

DESCRIPTION OF THE PREFERRED EMBODIMENTS

Hereinafter, preferred embodiments of the present invention will be described with reference to the accompanying drawings. FIGS. 1, 2, 3A and 3B show the first embodiment of the present invention. In this embodiment, for the sake of a simple explanation, an example of the atomic force microscope (AFM) will be explained. However, the scanning probe microscope to which the present invention applied is not limited to this microscope.

Figure 1:
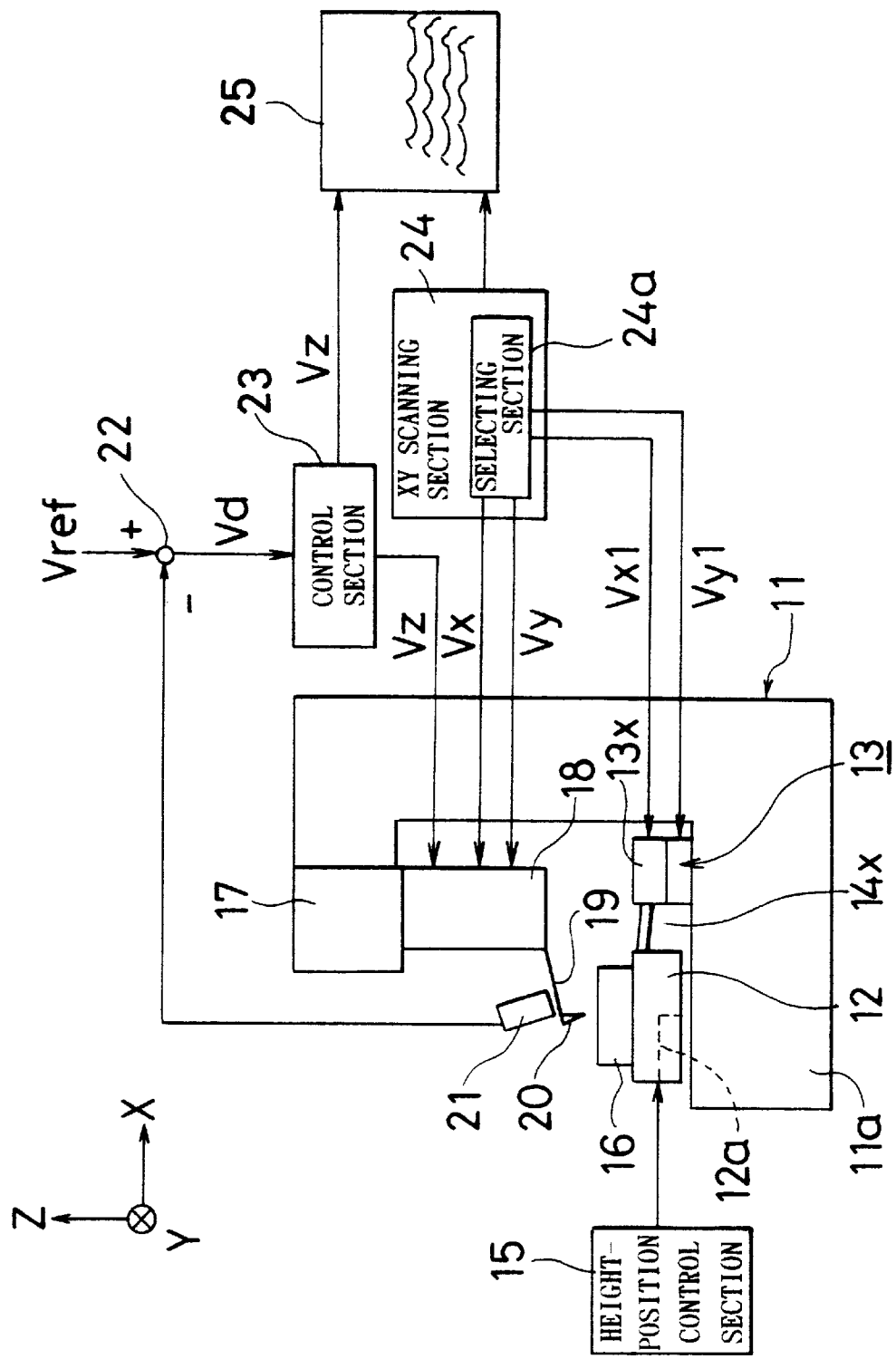
FIG. 1 is a view showing a configuration of the first embodiment of the present invention.
Figure 2:
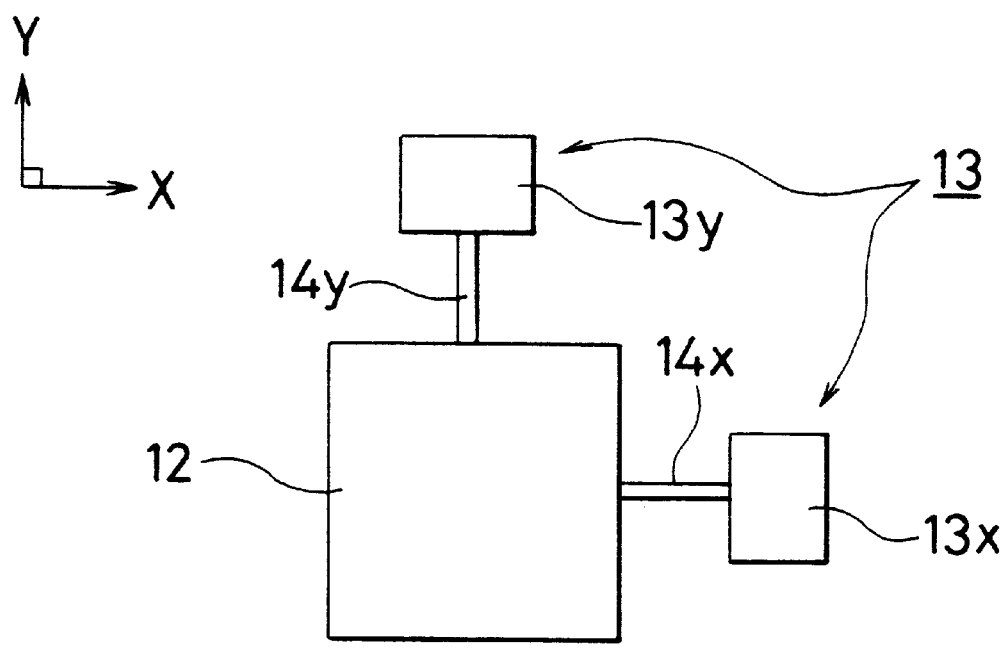
FIG. 2 is a plan view showing a main configuration of the first embodiment.

A reference numeral 11 denotes a frame of the AFM. A lower section of the frame 11 forms a microscope stage 11a. An upper surface of the microscope stage 11a is a standard surface. An XY moving section 12 is arranged on the standard surface of the microscope stage 11a and further an XY actuator (actuating mechanism) 13 for moving the XY moving section 12 in X and Y directions is fixed to the standard surface of the microscope stage 11a. As shown in FIG. 2, the XY actuator 13 comprises an X direction actuator (13x) and a Y direction actuator (13y), and each of the actuators (13x, 13y) and the XY moving section 12 is coupled through coupling sections 14x and 14y. An electromagnetic coil-type motor (voice coil motor), an electromagnetic motor, a piezoelectric motor, a displacement expand mechanism or other various actuators will be used for the XY actuator 13.

In the aforementioned configuration, though the mechanism comprising the actuators 13x and 13y and the coupling sections 14x and 14y is used as a unit causing the XY moving section 12 to move in the X and Y directions, the configurations of the XY moving section 12 and an actuating mechanism thereof may be optionally selected. For example, an actuating mechanism configured by a combination of an ordinary rolling guide mechanism and a ball-thread, etc. may be employed. Further, for example, the movement stage proposed in Japanese Patent Application No. 9-290325 by the same inventors of this patent application may be used.

A passage 12a for flowing high-pressure fluid (high-pressure air or high-pressure oil and the like) is formed within the XY moving section 12. An inlet of the passage 12a is formed in a side wall of the XY moving section 12 and at least one outlet is formed on a base thereof. An output pipe of a height-position control section 15 is connected to the inlet of the passage 12a. This height-position control section 15 supplies the high-pressure fluid to the passage 12a of the XY moving section 12. The high-pressure fluid supplied from the height-position control section 15 into passage 12 is emitted from the outlets of the base of the XY moving section 12. When the high-pressure fluid is emitted from the outlets of the base, the arrangement position (height-position) of the XY moving section 12 rises upward from the standard surface of the microscope stage 11a and the XY moving section 12 floats above the standard surface. That is, the high-pressure fluid emitted from the outlets of the base of the XY moving section 12 makes a supporting mechanism substantially equivalent to a static pressure bearing mechanism, which enables the XY moving section 12 to move in the X and Y directions along the standard surface under a static pressure guide. The static pressure bearing mechanism has been utilized in various technical fields. According to this static pressure bearing mechanism, the high-pressure fluid supports the XY moving section 12 and therefore the rigidity of the mechanism for supporting the XY moving section 12 can be kept sufficiently high. As mentioned above, the XY moving section 12, the XY actuator 13 and the height-position control section 15 compose an XY movement mechanism of a static pressure guide type.

The high-pressure fluid supplying operation by means of the height-position control section 15 can be selectively carried out in response to requests on the basis of operation of a measurement operator. When the height-position control section 15 does not supply the high-pressure fluid into the passage 12a of the XY moving section 12, the XY moving section 12 is arranged to come in contact with the standard surface of the microscope stage 11a because of emitting no high-pressure fluid from the outlets of the base. In this case, the rigidity of the mechanism as to the XY moving section 12 becomes higher. A sample 16 is disposed on the upper surface of the XY moving section 12.

Further a probe tip approaching mechanism (coarse movement mechanism) 17 is fixed to an upper section of the above-mentioned frame 11. Further, an XYZ fine movement mechanism 18 is fixed to a lower side section of the probe tip approaching mechanism 17. The configuration as to the probe tip approaching mechanism 17 and the XYZ fine movement mechanism 18 is essentially identical to that of the conventional unit. As the XYZ fine movement mechanism 18, a tripod-type fine movement mechanism or a tube-type fine movement mechanism utilizing piezoelectric elements, or a parallel-plate-type fine movement mechanism can be used, for example. The XYZ fine movement mechanism 18 comprises an XY fine movement mechanism (surface-directions fine movement mechanism) related to the scanning action of the probe tip (action for changing a relative position between the probe tip and the sample in the direction along to the sample surface), and a Z fine movement mechanism (height-direction fine movement mechanism) for changing the height-position of the probe tip to the surface of the sample. Further, the XY fine movement mechanism comprises an X actuator and a Y actuator which are made of piezoelectric elements, and the Z fine movement mechanism includes a Z actuator made of a piezoelectric element.

A cantilever 19 is disposed above the sample 16 and a probe tip 20 arranged at the tip of the cantilever 19 is directed to the surface of the sample 16. When measuring the surface of the sample 16, the probe tip 20 comes close to the sample 16 so that the atomic force can be generated between the probe tip and the sample. The base end of the cantilever 19 is fixed to the lower end of the XYZ fine movement mechanism 18. The cantilever 19 has necessary flexibility and further a peculiar characteristic that flexural deformation may be generated in response to a change of the atomic force corresponding to the change of the distance between the probe tip and the sample.

The probe tip approaching mechanism 17 is used to cause the probe tip 20 to quickly approach the sample 16 before carrying out the measurement, and is suitable for a comparatively long distance movement (coarse movement).

A displacement detector 21 for detecting the displacement of the cantilever is arranged against the cantilever 19. As a displacement detector 21, in general, a conventional optical-lever-type detecting optical system or detector utilizing the interference method may be used.

In the above-mentioned configuration, when the distance between the probe tip 20 and the sample comes to be about 1 nm by means of the probe tip approaching mechanism 17, the cantilever 19 is bent due to the atomic force generated between the probe tip and the sample. A flexural angle in the cantilever 19 can be detected through the displacement detector 21. A detecting signal outputted by the displacement detector 21 is provided to an adder 22. The adder 22 compares the detecting signal with a standard value $V_{ref}$ and outputs a deviation signal Vd indicative of the difference between the detection signal and the standard value. This deviation signal is inputted into a control section 23. The control section 23 generally carries out a positional and integral compensation processing (PI control) and provides an output signal (Vz) for the Z actuator included in the XYZ fine movement mechanism 18 so as to change the distance between the probe tip 20 and the sample 16. The distance between the probe tip 20 and the sample 16 is maintained to be the specific distance predetermined based on the standard value $V_{ref}$. Thus, a control system is provided for keeping the distance between the probe tip 20 and the sample 16 to be the standard distance determined by the standard value $V_{ref}$.

When carrying out the measurement at the high resolution by means of keeping the sample 16 in a state of rest and causing the probe tip 20 to scan the surface of the sample 16 by the XYZ fine movement mechanism 18, an XY scanning section 24 supplies its scan signals (Vx, Vy) to the X and Y actuators included in the XYZ fine movement mechanism 18. The scan signals (Vx, Vy) are used for causing the probe tip 20 to scan the surface of the sample 16 in the X and Y directions. During the scanning operation on the surface, the above-mentioned control system keeps the distance between the probe tip 20 and the sample 16 to be constant. Data Vz indicative of the movement amount of the Z actuator obtained in the high-resolution measurement by the XYZ fine movement mechanism 18 and data (Vx, Vy) indicative of output signals of the XY scanning section 24 are stored in a memory (not shown). A well-known signal processing section (not shown) carries out necessary processing by using these data to display images as to the sample surface on the screen of a display unit 25. In accordance with the above-mentioned operation, the AFM is capable of measuring the surface shape of the sample 16 at the original high resolution. In the AFM carrying out the measurement on the basis of the above-mentioned measurement principle, the observation on the sample surface can be done at the high resolution no more than a nanometer level corresponding to the atomic size.

The XY scanning section 24 includes a selecting section 24a. Switching operation in the selecting section 24a can select either one of sending the scan signals (Vx, Vy) to the XY fine movement mechanism of the XYZ fine movement mechanism 18 and sending other scan signals (Vx1, Vy1) to the XY actuator 13. The scanning operation based on the scan control of the scanning section 24 includes two scanning operation modes, that is, the above-mentioned conventional scanning operation mode by means of the XYZ fine movement mechanism 18 and the different scanning operation mode by utilizing the added XY movement mechanism of the static pressure guide type, and either one of the two scanning operation modes can be selected in response to measurement situations.

Figure 3A:
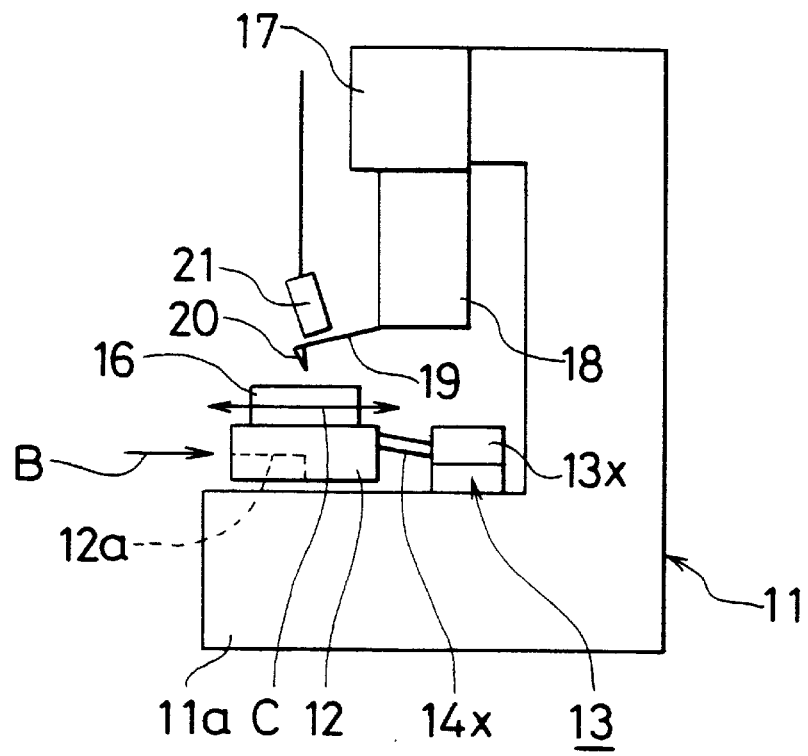
FIG. 3A is a view showing the scanning operation by utilizing an XY movement mechanism of a static pressure guide in the first embodiment.

In reference to FIGS. 3A and 3B, two cases of carrying out the scanning operation by means of the XYZ fine movement mechanism 18 and the scanning operation by means of the static pressure guide XY movement mechanism will be explained. FIG. 3A shows the latter scanning operation and FIG. 3B shows the former scanning operation.

Figure 3B:
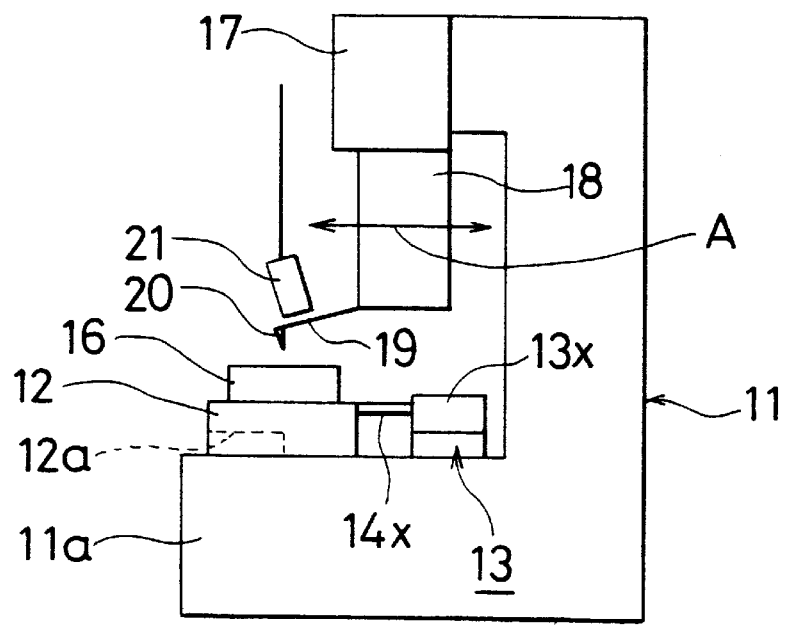
FIG. 3B is a view showing the scanning operation by utilizing an XYZ fine movement mechanism in the first embodiment.

Concretely, FIG. 3B shows the state that the height-position control section 15 supplies no high-pressure fluid into the passage 12a of the XY moving section 12. In this case, the XY moving section 12 may be disposed to come in contact with the microscope stage 11a. The probe tip 20 is set to be directed to the specific surface of the sample 16 in a state of rest and further afterward is moved in the direction shown by an arrow mark (A) by operating the XYZ fine movement mechanism 18. In accordance with the scanning operation based on the XYZ fine movement mechanism 18 under the control by the above-mentioned control system, the observation and measurement of the high resolution no more than 1 nm can be performed. In this case, the selecting section 24a in the XY scanning section 24 is switched to output the scan signals Vx and Vy.

On the other hand, FIG. 3A shows the state that the height-position control section 15 supplies the high-pressure fluid "B" into the passage 12a of the XY moving section 12. In this case, the XY moving section 12 is maintained to be the state of the static pressure guide. Further, the XY moving section 12 is kept to have comparatively high rigidity in the Z direction. The XY moving section 12 floating above the standard surface can be moved in the X and Y directions (for example, a "C" direction) by means of both the X actuator 13x and the Y actuator 13y. The probe tip 20 is set to be directed to the surface of the sample 16, and the above-mentioned control system and the Z actuator in the XYZ fine movement mechanism 18 supporting the cantilever 19 are set to be active. Further, the selecting section 24a of the XY scanning section 24 is switched to output the scan signals Vx1 and Vy1. When the probe tip 20 scans the surface of the sample 16, the surface shape of the sample 16 can be measured at the high resolution of about 1 nm. When displaying the images as to the surface shape on the display unit 25, the data Vz and the scan signals Vx1 and Vy1 are used in the signal processing. In the measurement based on the scanning operation shown in FIG. 3A, the measurement range as the AFM can be expanded to a few mm (millimeter) or a few hundreds mm because the movement amount of the XY actuator 13 is not limited. The AFM according to this embodiment is capable of observing and measuring a wide range on the surface of the sample 16. Further, since the static pressure guide is utilized for the movement of the XY moving section 12, there is no friction in the movement and smooth scanning operation can be realized.

Concerning the relationship between the measurement based on the scanning operation shown in FIG. 3A and the measurement based on the scanning operation shown in FIG. 3B, in general, after obtaining sample information on the wide range by means of the wide range scanning measurement as shown in FIG. 3A and thereby being capable of observing a certain characteristic spot, the high-resolution measurement no more than about 1 nm is performed in regard to the characteristic spot by stopping the static pressure guide operation as shown in FIG. 3B. When stopping the static pressure guide operation and causing the XY moving section 12 to come in contact with the standard surface, the rigidity of the whole mechanism becomes maximum. Therefore, the original high-resolution measurement no more than 1 nm can be performed in the AFM.

In accordance with the above-mentioned embodiment, both the wide-range measurement and the high-resolution measurement can be compatible in one AFM. Though the resolution in the wide-range measurement is practically lower than the ideal high resolution, the practical high resolution equal to almost 1 nm can be ensured as a whole in the AFM. The resolution in the wide-range measurement is sufficiently useful when considering that it is the desirable wide-range measurement. In addition, the XY movement mechanism comprising the XY moving section 12, the XY actuator 13 and the height-position control section 15 is also used as a position determining mechanism for the high-resolution measurement performed later.

Further, when the high resolution is necessary as to the X and Y directions and the resolution of almost a few nm is enough as to the Z direction in response to objects or situations to be measured, the AFM having the above-mentioned configuration can carry out such a specific measurement that the XY fine movement mechanism performs the scanning operation with the state of causing the XY moving section 12 to float. In accordance with this system, though the resolution in the Z direction is not high, the control for changing the operation state of the height-position control section 15 becomes unnecessary and therefore the operation of switching the wide-range measurement and the high-resolution measurement in a narrow-range can be smoothly performed.

Next, the second embodiment of the present invention will be explained with reference to FIG. 4. In this second embodiment, components substantially identical to those explained in the first embodiment are respectively represented by the same reference numerals and further the detailed explanation as to the components is omitted. A characteristic configuration of the second embodiment will be explained in the following. The AFM of the second embodiment is further equipped with a different kind microscope (different kind of probe) 31 of another type. An ultrasonic microscope (ultrasonic probe) or a laser beam microscope and the like may be used as the different kind microscope 31. The resolution of the different kind microscope 31 corresponds to about 1 micrometer($\mu$m) or sub-micrometer and a scanning range to be required lies in the range from 100 $\mu$m to a few mm.

When obtaining information on the surface or the inside of the sample 16 by means of the different kind microscope 31, the operation for scanning the sample surface is performed by utilizing the XY movement mechanism of the static pressure guide type. The XY movement mechanism of the static pressure guide type has sufficient mechanism-rigidity for the different kind microscope 31 with the low resolution. After the characteristic spots are detected by the observation of the different kind microscope 31, the characteristic spots are further observed by the AFM as the following step. This operation is the same as that explained in the first embodiment.

A selecting section 32 is arranged between the control section 23 and the display unit 25. This selecting section 32 selects either one of data Vz outputted from the control section 23 and the measurement data outputted from the different kind microscope 31, and sends it to the side of the display unit 25.

In accordance with the configuration of the second embodiment, the scanning probe microscope such as the AFM and the like can be combined with the different kind microscope and consequently the sample can be observed by the different kind microscope from other viewpoints together with the original high-resolution observation, and thus the utility value of the scanning probe microscope can be raised.

Figure 5A:
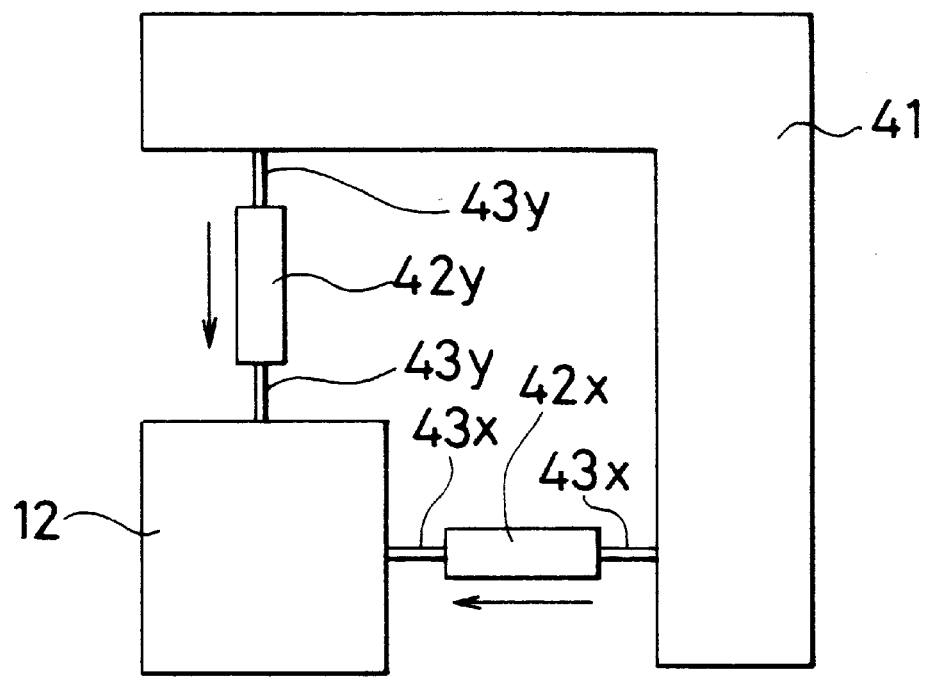
FIGS. 5A–5D are views illustrating an example of configuration and operation of the movement mechanism of the static pressure guide.
Figure 5B:
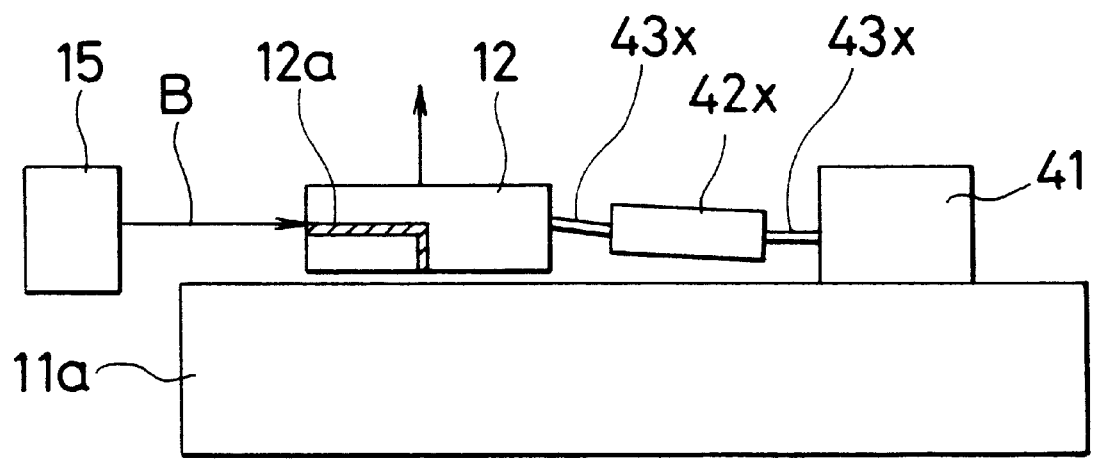
Figure 5C:
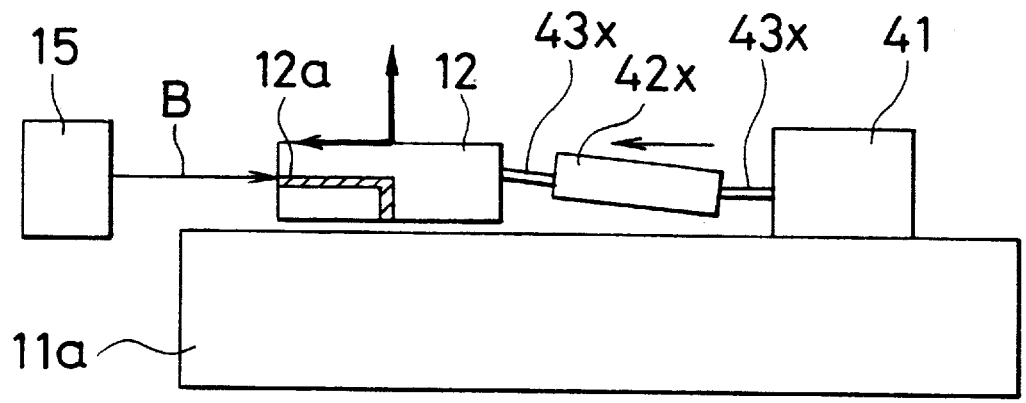
Figure 5D:
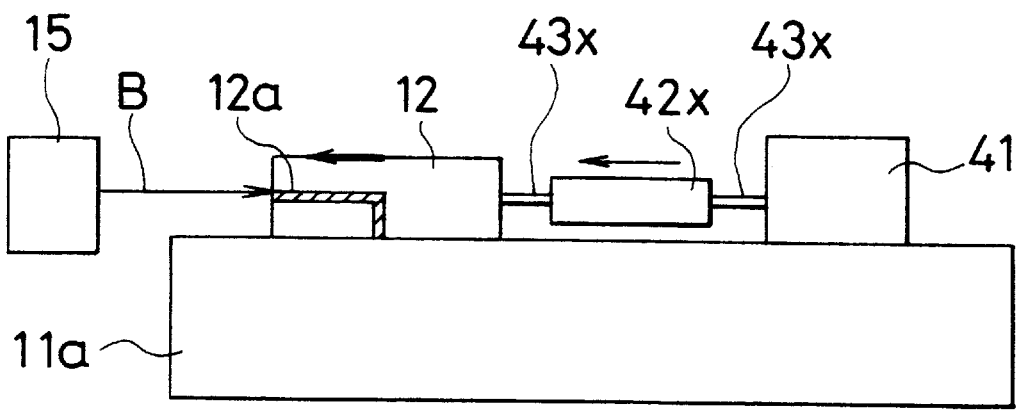
Figure 6:
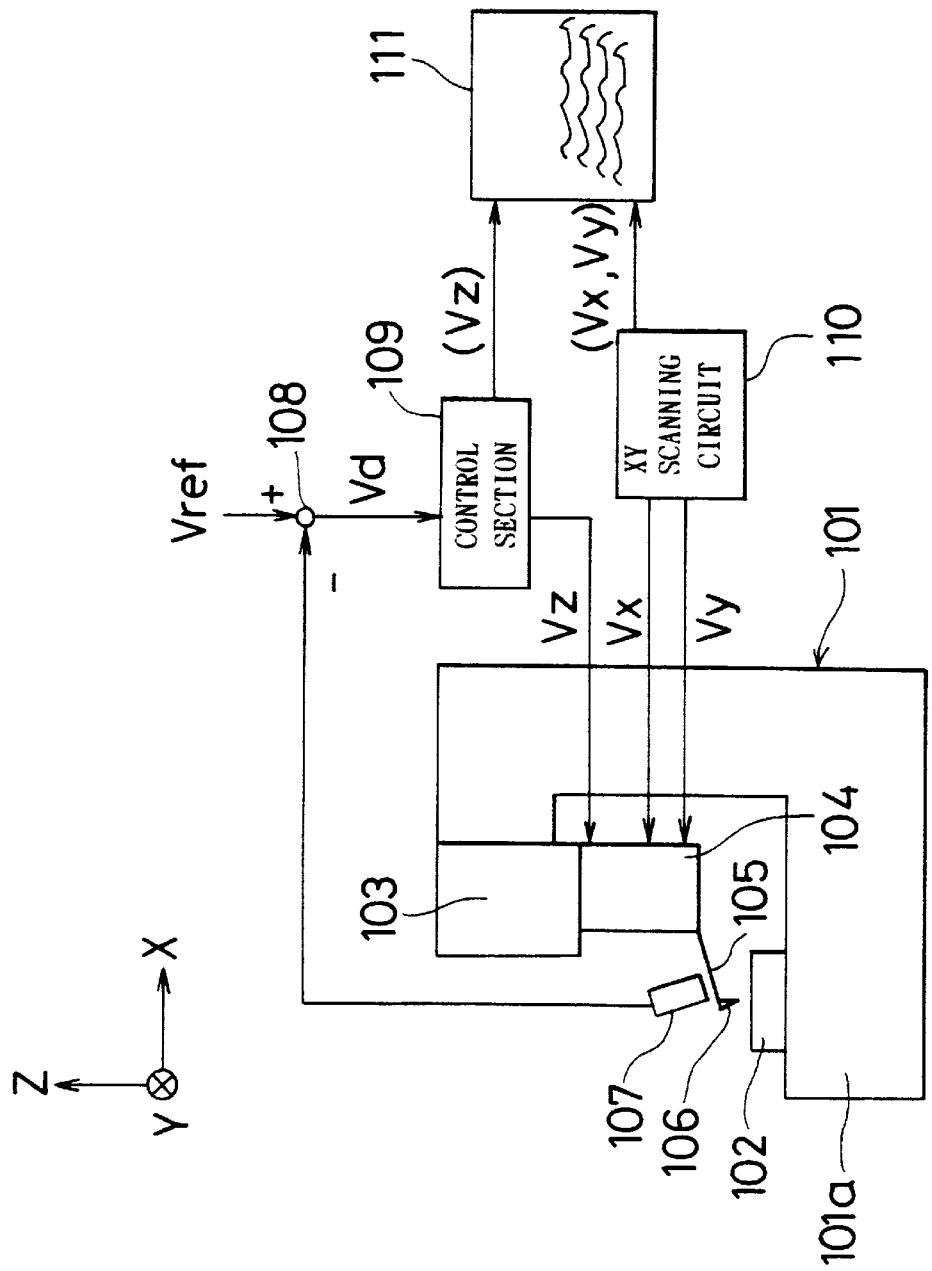
FIG. 6 is a view showing an example of the conventional scanning probe microscope.

Next, an example of the above-mentioned XY movement mechanism of the static pressure guide system will be explained with reference to FIGS. 5A–5D. FIG. 5A is a plan view and FIGS. 5B–5D are respectively side views showing an operating state. The XY movement mechanism comprises the XY moving section 12, an "L" character-shaped supporting section 41 fixed to the standard surface of the microscope stage 11a, the X and Y actuators 42x and 42y placed between the XY moving section,12 and the supporting section 41, and coupling sections 43x and 43y. The two coupling sections 43x couple the X actuator 42x with each of the XY moving section 12 and the supporting section 41, and The two coupling sections 43y couple the Y actuator 43y with each of the XY moving section 12 and the supporting section 41.

The coupling sections 43x and 43y of the present embodiment are made of a member such as a pole and are freely movable in any directions except for their axial direction. As the coupling sections 43x and 43y, the mechanical structure such as a hinge may be employed.

When the height-position control section 15 is set to be the state of the high-pressure fluid supplying operation as shown in FIG. 5B, the XY moving section 12 floats above the standard surface of the microscope stage 11a. As shown in FIG. 5C, in this state, if the X actuator 42 operates to be expanded or contracted, the XY moving section 12 is movable toward the X direction in the state of the static pressure guide. Further, as shown in FIG. 5D, if the static pressure guide operation based on the height-position control section 15 is stopped, the XY moving section 12 comes into contact with the standard surface at its base and is disposed on the standard surface in a state of rest.

In the XY movement mechanism shown in FIGS. 5A–5D, as mentioned above, similarly, the mechanism configured by combining the ordinary ball-and-roller guide mechanism and the ball thread may be used as the mechanism for guiding the X and Y directions movement of the XY moving section 12. Further, concerning the movement guide in the Z direction, the plate spring mechanism or the ball-and-roller guide mechanism may be also utilized. It is a matter of course that the movement stage apparatus proposed in the above-mentioned Japanese Patent Application No. 9-290325 may be used.

Though the probe tip approaching mechanism 17 is arranged on the side of the XYZ fine movement mechanism 18, it can be arranged within the XY moving section 12. In this case, if the ascend and descend mechanism using a wedges-combination mechanism is employed as the probe tip approaching mechanism, the rigidity thereof is extremely raised.

Further, though the complex configuration combining the AFM with the different kind microscope has been shown, it is possible that a whole configuration is made as a single kind microscope and is used as the AFM or another type microscope individually by exchanging them selectively.

Since the scanning probe microscope of the present invention has the additional movement mechanism utilizing the static pressure guide system and can measure the sample based on the scanning operation of the additional movement mechanism, it can carry out the measurement with the high resolution no more than 1 nm as the conventional scanning probe microscope and further can be switched to carry out the wide-range measurement by expanding the scanning range utilizing the movement mechanism of the static pressure guide in response to the situations. The scanning probe microscope of the present invention is useful for obtaining sample information on the comparatively wide range and detailed sample information on the very narrow range including the characteristic spot, because the original high-resolution measurement is combined with the wide-range measurement utilizing the static pressure guide movement mechanism. Further, to perform the scanning operation utilizing the static pressure guide movement mechanism easily enables to combine the scanning probe microscope with other type probes such as the ultrasonic probe or the laser beam probe and the like.

What is claimed is:

1. A scanning probe microscope in which a probe tip scans a surface of a sample by means of a fine movement mechanism, for measuring a surface characteristic of the sample by using a control signal which is generated on a signal outputted from a displacement detecting mechanism for detecting displacement of said probe tip and is used for keeping a state of a mutual action between the sample and said probe tip identical to a predetermined state, comprising:

a moving section arranged on a standard surface of a microscope stage, which has the sample on an upper surface thereof and moves along the standard surface based on a static pressure guide at a base thereof, a height-position control section for supplying high-pressure fluid to said moving section so as to carry out the static pressure guide and controlling the height-position of said moving section with respect to the standard surface, and an actuating mechanism for moving said moving section in directions parallel to the standard surface, wherein said moving section, said height-position control section and said actuating mechanism compose a movement mechanism, further, wherein said fine movement mechanism comprises a height-direction fine movement mechanism for changing a height-position of said probe tip to the surface of the sample, and a surface-directions fine movement mechanism for changing a relative position between the sample and said probe tip in directions parallel to the surface of the sample, and when causing said probe tip to scan the surface of the sample in order to measure the sample by said probe tip, either one of said movement mechanism and said surface-directions fine movement mechanism is used to measure the surface characteristic of the sample and, when carrying out scanning operation by said surface-directions fine movement mechanism, said static pressure guide based on said height-position control section of said movement mechanism is maintained in operation to keep said moving section floating, and when carrying out the scanning operation by said moving mechanism, said surface-directions fine movement mechanism is not in operation.

2. The scanning probe microscope according to claim 1, further comprising a switching means for switching the operation of said surface-directions fine movement mechanism and said movement mechanism.

3. The scanning probe microscope according to claim 1, wherein measurement based on the scanning operation of the movement mechanism is coarse measurement in a wide range on the surface of the sample.

4. The scanning probe microscope according to claim 1, wherein said movement mechanism is used as a position determining mechanism.

5. The scanning probe microscope according to claim 1, wherein said fine movement mechanism comprises a height-direction fine movement mechanism for changing a height-position of said probe tip to the surface of the sample, and a surface-directions fine movement mechanism for changing a relative position between the sample and said probe tip in directions parallel to the surface of the sample, and when causing said probe tip to scan the surface of the sample in order to measure the surface characteristics of the sample, said surface-directions fine movement mechanism is operated, while said height-position control section of said movement mechanism is operative.

6. The scanning probe microscope according to claim 1, further comprising a measuring probe of another type, wherein said movement mechanism is used for carrying out scanning operation when measuring the sample by said measuring probe.

7. The scanning probe microscope according to claim 6, wherein said measuring probe of another type is an ultrasonic probe or a laser beam probe.

8. A scanning probe microscope in which a probe tip scans a surface of a sample by means of a fine movement mechanism, for measuring a surface characteristic of the sample by using a control signal which is generated on a signal outputted from a displacement detecting mechanism for detecting displacement of said probe tip and is used for keeping a state of a mutual action between the sample and said probe tip identical to a predetermined state, comprising:

- a moving section arranged on a standard surface of a microscope stage, which has the sample on an upper surface thereof and moves along the standard surface based on a static pressure guide at a base thereof,
- a height-position control section for selectively supplying high-pressure fluid to said moving section so as to carry out the static pressure guide and controlling the height-position of said moving section with respect to the standard surface, and
- an actuating mechanism for moving said moving section in directions parallel to the standard surface,
- wherein said moving section, said height-position control section and said actuating mechanism compose a movement mechanism,
- further, wherein said fine movement mechanism comprises a height-direction fine movement mechanism for changing a height-position of said probe tip to the surface of the sample, and a surface-directions fine movement mechanism for changing a relative position between the sample and said probe tip in directions parallel to the surface of the sample, and
- when moving said probe tip on the surface of the sample a relatively large distance, the static pressure guide of said moving mechanism is used, and
- when measuring the surface characteristic of the sample, the static pressure guide of said moving mechanism is stopped to cause said moving section to come in contact with the standard surface and said moving section is moved by said actuating mechanism in a contact mode in order to cause the sample to be moved.

* * * * *